United States Patent [19]

Gaudreau

[11] Patent Number: 4,973,438
[45] Date of Patent: Nov. 27, 1990

[54] METHOD FOR FOAM FILLING VINYL ARTICLES

[75] Inventor: Laurent R. Gaudreau, Berwick, Me.
[73] Assignee: Davidson Textron Inc., Dover, N.H.
[21] Appl. No.: 408,553
[22] Filed: Sep. 18, 1989
[51] Int. Cl.[5] .................. B29C 39/08; B29C 39/12
[52] U.S. Cl. ................................ 264/45.7; 156/78; 156/155; 156/245; 264/45.4; 264/310; 264/313
[58] Field of Search .............. 156/78, 172, 245, 155, 156/94; 264/45.4, 45.7, 310, 313, 317, 45.6; 5/464

[56] References Cited

U.S. PATENT DOCUMENTS 2,989,783  6/1961  Slapnik ........................ 264/45.4
3,607,999  9/1971  Corbett .

FOREIGN PATENT DOCUMENTS 51-60254  5/1976  Japan ............................ 264/45.7

Primary Examiner—David A. Simmons
Assistant Examiner—James J. Engel, Jr.
Attorney, Agent, or Firm—John C. Evans

[57] ABSTRACT

A method of making a foam filled polymer article includes the steps of compressing an expandable foam material (12) and containing the compressed expandable material (12) in a degradable container, such as a polyethylene bag (16). An outer polymer shell (10) is formed while degrading the container (16) therewithin, such as by rotation molding. The shell (10) is filled with the uncontained expandable foam material (12).

6 Claims, 1 Drawing Sheet

METHOD FOR FOAM FILLING VINYL ARTICLES

TECHNICAL FIELD

The present invention relates to a method of making a foam filled polymer article. More particularly, the present invention is well suited for forming an outer polymer shell about a scrap foam core.

BACKGROUND ART

Scrap foam is a by-product of various molding and manufacturing techniques and processes. Many processes have been directed at specifically recycling various scrap foams such as urethane foam scraps. For example the U.S. Pat. No. 3,859,404 to Immel et al, issued Jan. 7, 1975 relates to treating plastic foam scrap material to convert it into a densified foam. The U.S. Pat. No. 3,607,999 to Corbett issued Sept. 21, 1971, relates to the recovery of thermoplastic foam scrap as extruded granules. The U.S. Pat. No. 3,080,612 to Buchmann, issued Mar. 12, 1963 relates to a process of molding foam products from waste foam materials.

Other prior art processes relate to the technique of containing a precursor material in a bag which ruptures to provide a fixed charge to a mold. For example, the U.S. Pat. No. 2,959,816 to Valentine et al, issued Nov. 15, 1960, discloses an apparatus and method for mold charging which substantially eliminates waste of casting material by utilizing a bag containing a plastisol which ruptures to provide a fixed charge to a mold. The charge does not include a precompressed foam. The U.S. Pat. No. 3,347,971 to Makowich et al, issued Oct. 17, 1967, discloses a rotational mold process in which a fixed charge of PVC particles is placed in a rotating mold to form hollow balls. The patent discusses the use of defective items which may be refragmented and remolded successively but does not disclose any steps relating to precompressing the scrap, containing the precompressed scrap and then charging a mold therewith.

Various prior art patents relate to other uses of containment bags into which foam precursors are directed. For example, the U.S. Pat. No. 4,269,890 to Breitling et al, issued May 26, 1981, discloses a process and arrangement for introducing a material such as foam into automobile body cavities by initially introducing a bag into the cavity with the bag being provided with a filler opening. A mixture of expandable components is introduced into the bag and following an expansion reaction or a setting, the foam fully fills the bag. The bag is not used to contain a compressed foam but rather as a test tube for the foaming reaction.

The U.S. Pat. No. 4,238,537 to Kerr, issued Dec. 9, 1980, discloses a rotationally molded hollow article and a process for molding the article wherein the article is formed from a mixture of plastic pellets and powder both of which are copolymers of ethylene and vinyl acetate.

The U.S. Pat. No. 4,035,462 to Lane, Jr., issued July 12, 1977, discloses a method for making hollow parts by rotationally molding cross linked polyethylene and reheating the part to expand trapped air and then rapid chilling of the part to stiffen the plastic before the trapped air cools and contracts.

Accordingly, the use of rotational molding, the use of container bags in molding processes, and the reuse of polyurethane foam are each in and of themselves known to the prior art. However, there remains the need for more efficient and less costly molding techniques which utilize scrap foam for producing foam filled plastic parts.

SUMMARY OF THE INVENTION

In accordance with the present invention, there is provided a method of making a foam filled polymer article, the method including the steps of compressing an expandable material and containing the compressed expandable material in a degradable container. An outer polymer shell is formed while degrading the container therewithin. The shell is filled with the uncontained expandable material.

FIGURES IN THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
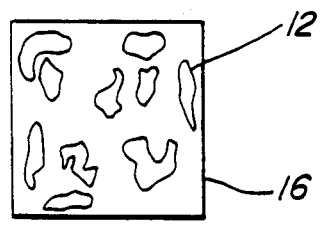
FIG. 1 is a schematic representation of the compressed expandable material being contained within a degradable urethane.
Figure 2:
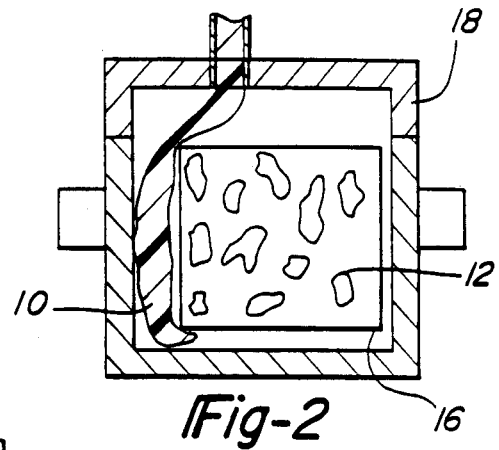
FIG. 2 is a schematic cross sectional representation of a rotational mold containing the bag of compressed foam and a polymer charge.
Figure 3:
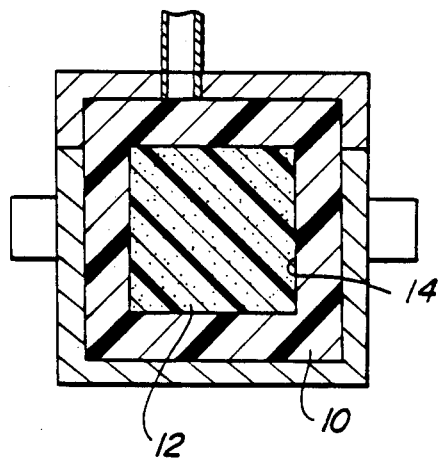
FIG. 3 is a cross sectional schematic representation of a foam filled polymer article made in accordance with the present invention.
Figure 4:
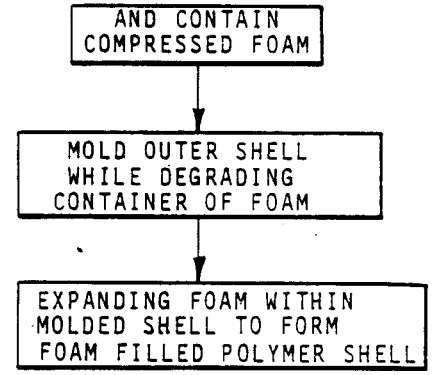
FIG. 4 illustrates schematically the process steps of the present invention.

The steps of the present invention are schematically shown in FIGS. 1–3 and described in FIG. 4. More specifically, the invention provides a method of making a foam filled polymer article as shown in FIG. 3. The article includes an outer polymer shell 10 and an inner foam core 12.

The outer shell 10 may be made from various polymers, preferably a vinyl polymer commonly used in the rotation molding art. Examples of such vinyls include liquid systems wherein polyvinylchloride is deposited and cured to form a shell. Alternatively dry powder vinyl systems can be used in which a resin material with suitable plasticizer and color pigment is formed as powder particles. The particles are fused together to form a suitable shell construction.

The foam material 12 can be made from an expandable urethane material, preferably urethane foam scrap material. The urethane foam scrap material is expanded so as to completely fill the otherwise hollow void 14 within the vinyl outer shell 10. Alternatively, preformed urethane foam can be ground-up into chunks, preferably of ⅛ inch to ½ inch.

The inventive method generally includes the steps of compressing an expandable material, such as the urethane foam 12 and containing the compressed material in a degradable container. The outer polymer shell 10 is formed while degrading the container therewithin. The shell is filled with the uncontained expandable material 12.

More specifically, a charge of ground-up urethane foam 12 or urethane scrap foam 12 is precompressed into a degradable container such as a polyethylene bag 16. By degradable, it is meant that the bag will melt or otherwise disintegrate during the subsequent molding step, as by the application of heat and pressure. The foam 12 is precompressed into the polyethylene bag 16 such that it has a significantly smaller size than when the foam is in the free uncompressed state. The free state volume of the urethane foam 12 must be greater than or equal to the volume of the article to be molded. That is, the molded article is made from the shell 10 having a predetermined internal hollow volume, the urethane foam in its free state being of a size greater than or equal to that predetermined volume.

The precompressed foam charge 12 contained within the bag 16 is loaded into a vinyl rotation mold 18 as shown in FIG. 2. A predetermined amount of the vinyl 10 is charged into the mold 18. The vinyl can be in liquid or dry form.

The polyethylene bag 16 containing the compressed foam material 12 is sealed prior to disposing the bag 16 in the mold 18. The polyethylene bag can be heat sealed or closed securely by some other method well known in the art.

The mold 18 can be coated before inserting the polyurethane foam filled bag 16 by spraying or other coating techniques known in the art.

During the rotation mold process, the mold is heated. During the mold heating cycle, the polyethylene bag ruptures due to the excessive heat. In certain mold processes the exotherm of the mold process can assist in degrading the polyethylene bag to release the expandable material. The unconstrained foam material 12 expands to fill the molded rotated article. The mold 18 is cooled and the finished article demolded, the article being shown in FIG. 3. The demolded article can be in various forms, such as a ball or box or a preform shape for immediate use, such as a trim part for an automobile interior. The article is foam filled and ready for immediate use as no further process steps are required.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A method of making a foam filled polymer article, said method including the steps of: compressing an expandable material (12); containing the compressed expandable material (12) in a degradable container (16); forming an outer polymer shell (10) while degrading the container (16) therewithin; and filling the shell (10) with the uncontained expandable material (12).

2. A method as set forth in claim 1 wherein said compressing step is further defined as compressing a foam material (12).

3. A method as set forth in claim 2 wherein said containing step is further defined as containing the compressed foam (12) in a heat degradable bag, said degrading step being further defined as applying sufficient heat and pressure during said forming step to degrade the bag.

4. A method as set forth in claim 3 wherein said containing step is further defined as containing the expandable material in a polyethylene bag.

5. A method as set forth in claim 3 wherein said compressing step is further defined as compressing a plurality of pieces of foam material.

6. A method as set forth in claim 1 wherein said forming step is further defined as rotation molding a charge of the polymer with the container disposed within the rotation mold, the exotherm of the molding step degrading the container disposed within the mold and releasing the expandable material and filling the molded polymer charge with the expandable material.

* * * * *